J. REESE.
Harrow.

No. 217,638. Patented July 15, 1879.

Witnesses
R. C. Wrenshall
John K. Smith

Inventor
Jacob Reese
per
Frank M. Reese, Attorney

UNITED STATES PATENT OFFICE.

JACOB REESE, OF PITTSBURG, PENNSYLVANIA.

IMPROVEMENT IN HARROWS.

Specification forming part of Letters Patent No. 217,638, dated July 15, 1879; application filed October 23, 1878.

*To all whom it may concern:*

Be it known that I, JACOB REESE, of the city of Pittsburg, in the county of Allegheny and State of Pennsylvania, have invented a new and useful Improvement in Portable Harrows; and I do hereby declare the following to be a full, clear, and exact description thereof.

This invention relates to certain new and useful improvements in harrows, hereinafter described and set forth, the principal features of which render the harrow capable of being transformed into a sled, so that it is not only of a portable nature, but may also be used in conveying the plow, seed, &c., to the field.

In the manufacture of harrows the great object is to produce the best harrow for the least money. In order that this desirable object may be had it is necessary that three points be obtained—namely, first, to produce a harrow that will be adapted to perform its work readily and effectively over either rough or even soil; secondly, that it combine simplicity and economy in construction and a low first cost; thirdly, that the harrow be of a portable nature, so that it may be readily transported from place to place. All of these desirable qualities are embodied in the improved harrow which I will now describe fully, so that others skilled in the art may make and operate the same.

Figure 1:
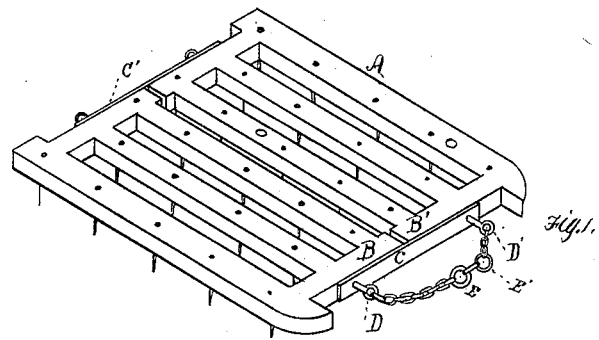
Figure 2:
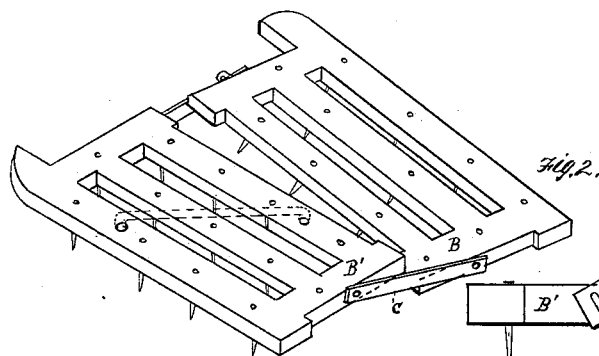
Figure 3:
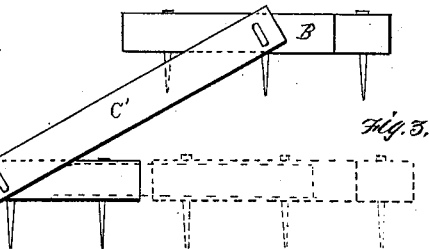
Figure 4:
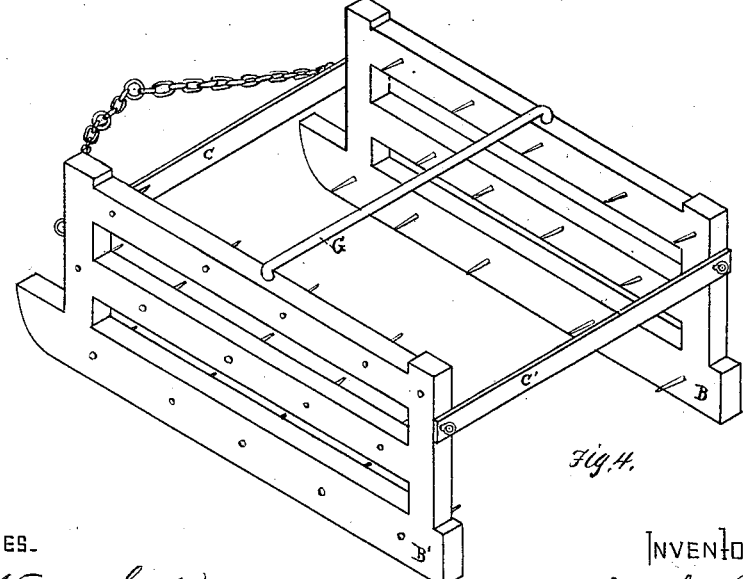

Reference being had to the accompanying drawings, (like letters indicating like parts wherever they occur,) Figure 1 is a perspective view of the harrow. Fig. 2 is a perspective view, showing a vertical movement. Fig. 3 is a perspective view, showing vibratory movements. Fig. 4 is a perspective view of the harrow adjusted.

A indicates the harrow-frame, which is made in two sections, as shown by B and B'. The forward part of the outer edge of each of these sections is curved or beveled off, so that when the harrow is sprung open from the center and raised upon its outer edges they form runners similar to those of an ordinary sled. The sections B and B' are joined together at their front and rear ends by the cross-bars or connecting-links C and C', which are pivoted, as shown at D and D', so that they may be sprung open from the center of the harrow and turned upon their outer edges when it may be desired to move the harrow from place to place.

The pivots D and D' are furnished with projecting eyes, to which a chain is attached, which is used for drawing the harrow when working, and also when it is being moved from place to place. This chain is furnished with two large links or rings, E and E'. The ring E is attached to the middle of the chain in order that draft or strain in transporting the harrow may be equally distributed upon both of the projecting eyes of the pivots which are attached to the sections or runners B and B'. The ring E' is attached to the chain near to one of its ends, and is used when harrowing, so that the harrow may be drawn diagonally in the usual way, and the teeth made to engage different portions of the soil, and not be drawn in lines after each other.

G indicates a brace or cross-bar, which is used when the sections have been turned up to form runners to lock the sections together securely and prevent them from turning upon the pivots. This brace I form by taking a bar of iron or other suitable material, and turning down both ends, and it is secured by inserting the ends into suitable orifices in the top of the sections. When the harrow is working the bar is held securely and prevented from getting lost by inserting its ends into other orifices on the faces of the frame-sections.

The advantages of the invention are, first, the sections are joined by connecting-rods, which are pivoted to each of them in a manner which not only admits of the movements possessed by ordinary harrows made in two sections and hinged together, but also of an independent longitudinal vibratory movement of each section, as shown in Fig. 2, and of an independent longitudinal vertical movement of each section, as shown in Fig. 3, thereby rendering the harrow capable of adjusting itself to any irregularity upon the face of the soil; secondly, the harrow may be adjusted to form a sled in a moment without trouble; and by placing one or two pieces of board across the top to form a bed, it may be used to convey seed-grain, the plow, or other articles to the field, thereby avoiding the necessity of a wagon for that purpose.

The cost of production being about the same as that of the ordinary harrow, in a practical way I believe it is the best harrow for the least money that has yet been produced.

If in working the harrow there appears to be any undue play of the two frame-sections, or if there is any difficulty when harrowing very rough soil on account of the sections turning too much on the pivots, it may be easily remedied by locking the frames together by a short piece of chain. Care should be had that the chain is slack enough to allow the necessary play to each of the sections.

Having described my invention, what I claim, and desire to secure by Letters Patent, is—

The combination of the harrow-sections, the connecting-links C C', and the brace-bar G, constructed to operate as shown and described.

In testimony whereof I, the said JACOB REESE, have hereunto set my hand.

JACOB REESE.

Witnesses:
A. C. JOHNSTON,
S. E. CARPENTER.